UNITED STATES PATENT OFFICE.

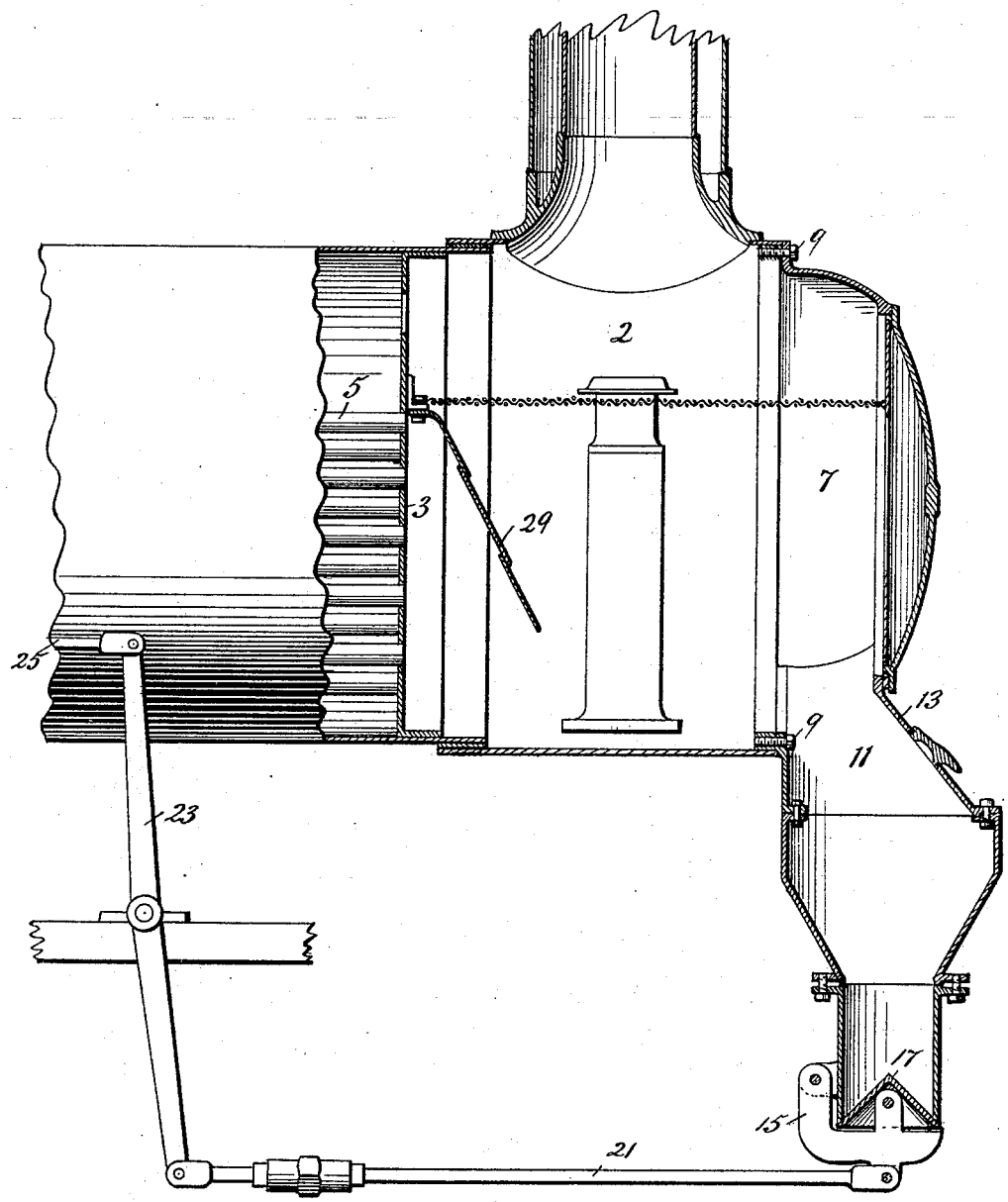

JOSEPH O. PATTEE, OF ST. PAUL, MINNESOTA.

SPARK-CATCHER.

SPECIFICATION forming part of Letters Patent No. 439,892, dated November 4, 1890.

Application filed May 23, 1890. Serial No. 352,837. (No model.)

*To all whom it may concern:*

Be it known that I, JOSEPH O. PATTEE, of St. Paul, in the county of Ramsey and State of Minnesota, have invented certain Improvements in Spark-Catchers, of which the following is a specification.

This invention relates to an improved device to be applied to a locomotive for the purpose of arresting sparks and depositing them below the line of draft and without an extension-front to catch and hold the cinders, so as to prevent throwing sparks from the stack and to allow them to cool off before being dropped along the track.

The invention consists, generally, in the construction and combination hereinafter described, and particularly pointed out in the claims.

The accompanying drawing, forming a part of this specification, is a longitudinal sectional view of the forward portion of a locomotive, showing my device applied thereto.

In the drawing, 2 represents the smoke-arch or smoke-box of a locomotive, which may be of any ordinary construction.

3 represents the forward end of the boiler, and 5 the forward ends of the flues.

At the forward end of the smoke-box is an extension-front 7, preferably secured to the smoke-box by bolts 9 or other suitable means. At the lower side of the extension-front and connecting therewith is a projection 11, having an inclined forward wall or front end 13, and below and secured to this projection is a box or receptacle, which may be of any suitable size and shape and is arranged below the line of draft of the locomotive. The lower end of this receptacle is opened, and is preferably provided with a pivoted lever 15, to which is secured the preferably cone-shaped valve 17, which is adapted to fit in and close the lower end of the receptacle. This valve is preferably arranged to be operated by a rod 21, lever 23, rod 25, running to a handle or lever in the cab; or any other suitable means may be used for operating the bar. Arranged in the smoke-box in front of the flues is an inclined deflecting-plate 29.

When the device is in operation, the sparks or cinders passing through the flues strike the deflecting-plate 29, and, being thrown downward by them, enter the open projection 11 and strike its forward inclined wall or front end 13, thereby being thrown downward into the receptacle, where, being below the line of draft, they remain. After a quantity of sparks or cinders have accumulated in the receptacle the valve is opened and they are discharged. As the cinders will have become cooled, there will be no danger from setting fire by dropping them along the track.

I claim as my invention—

1. The combination, with the smoke-arch and deflecting-plate, of the open projection 11, having the inclined forward end or wall 13 projecting above the base of the smoke-box, the receptacle connected thereto and arranged below the line of draft, the valve in said receptacle, and means for operating said valve, substantially as described.

2. The combination, with the smoke-arch and the deflecting-plate 29, of an open receptacle in front thereof and just forward of the line of the smoke-stack, the forward inclined wall of said receptacle projecting above the base of the smoke-box and inclined in a direction similar to that of said deflecting-plate.

3. The combination, in a spark-catcher, of the smoke-box and the deflecting-plate, with the extension-front 7 suitably secured to the front of the smoke-box, the open projection 11 in said extension, said projection being provided with the inclined forward wall 13, projecting above the base of the smoke-box, and the closed receptacle beneath said open projection 11, substantially as described.

4. The combination, with the short smoke-arch and the deflecting-plate 29, of the open receptacle arranged in front thereof below the line of draft and extending across the base of the smoke-box, the forward wall of said receptacle being inclined in a direction nearly corresponding to that of the said deflecting-plate, the upper edge of said forward wall extending above the base of the smoke-arch and the front end or plate of the said short smoke-arch forming a vertical extension of said upper edge of the forward wall, substantially as described.

In testimony whereof I have hereunto set my hand this 28th day of April, 1890.

JOSEPH O. PATTEE.

In presence of—
T. D. MERWIN,
BESSIE BOOTH.